United States Patent [19]

Weismantel

[11] Patent Number: 5,007,530
[45] Date of Patent: Apr. 16, 1991

[54] SINGLE PIECE DISPOSABLE CAT LITTER BOX

[76] Inventor: Donald Weismantel, 621 Hapsfield Apt. 106, Buffalo Grove, Ill. 60089

[21] Appl. No.: 483,763

[22] Filed: Feb. 23, 1990

[51] Int. Cl.$^5$ ............................ B65D 5/20; B65D 5/44
[52] U.S. Cl. .............................. 206/45.210; 119/168; 206/45.23
[58] Field of Search ................ 119/1; 206/44 R, 45, 206/45.2–45.23, 45.24–45.27; 220/339

[56] References Cited

U.S. PATENT DOCUMENTS

| | | | |
|---|---|---|---|
| 1,418,798 | 6/1922 | Hirschl | 206/45.21 |
| 1,457,305 | 6/1923 | Horr | 206/45.21 |
| 1,459,399 | 6/1923 | Hirsch | 206/45.21 |
| 1,542,285 | 6/1925 | Campbell | 206/45.21 |
| 1,590,683 | 6/1926 | Helfrich | 206/44 |
| 1,701,065 | 2/1929 | Darragh | 206/45.22 |
| 2,167,947 | 9/1938 | Hayes | 206/44 |
| 2,317,023 | 4/1943 | Kurhan | 206/45.23 |
| 3,442,371 | 7/1968 | Deshong | 206/45.23 |
| 3,645,382 | 2/1972 | Abrams | 206/45.21 |
| 3,743,170 | 7/1973 | Riccio | 119/1 |
| 4,779,567 | 10/1988 | Smith | 119/1 |

FOREIGN PATENT DOCUMENTS

| | | | |
|---|---|---|---|
| 2609689 | 7/1988 | France | 206/45.2 |
| 1023162 | 3/1966 | United Kingdom | 119/1 |

*Primary Examiner*—Jimmy G. Foster
*Attorney, Agent, or Firm*—Milton S. Gerstein; Marvin N. Benn

[57] ABSTRACT

The invention relates to the use of one piece foldable boxes in the area of packaging, in particular the use of a single piece foldable and disposable boxes for the packaging of cat litter material. The invention employs a novel cover and hinge member that folds beneath the lower portion of the box for storage. The box effectively seals the contents while in a closed position with double wall thickness and a latching mechanism that doubles as a carrying device on larger boxes. The design permits uniformity of tolerance throughout box sizes and construction materials. The box includes a lower box body (or base), four side walls integrally attached to the base, and a cover (or top) with three sides that is connected to the lower box body by a novel hinge member that creates a fourth side wall to the cover only when the box is in a closed position.

2 Claims, 2 Drawing Sheets

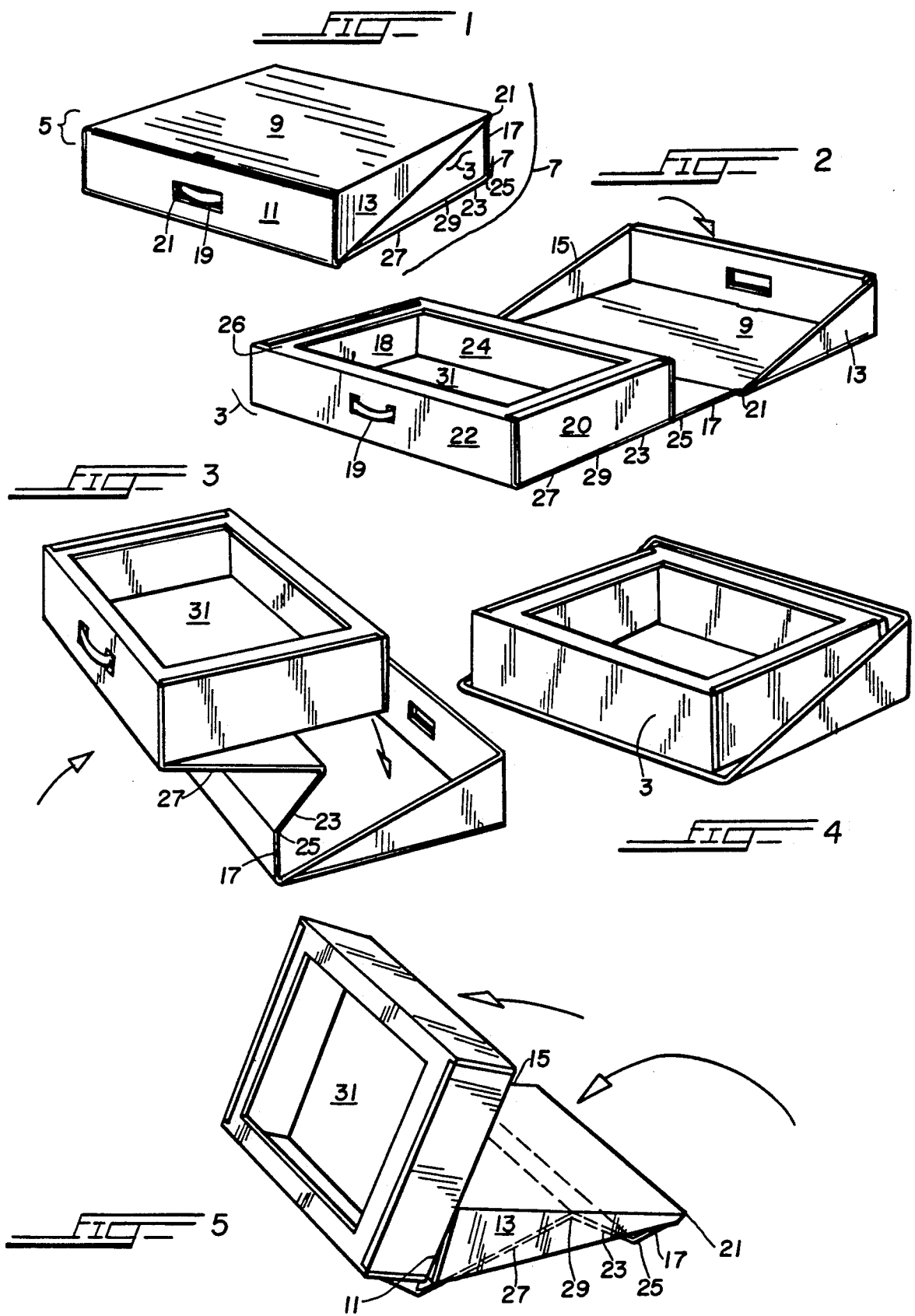

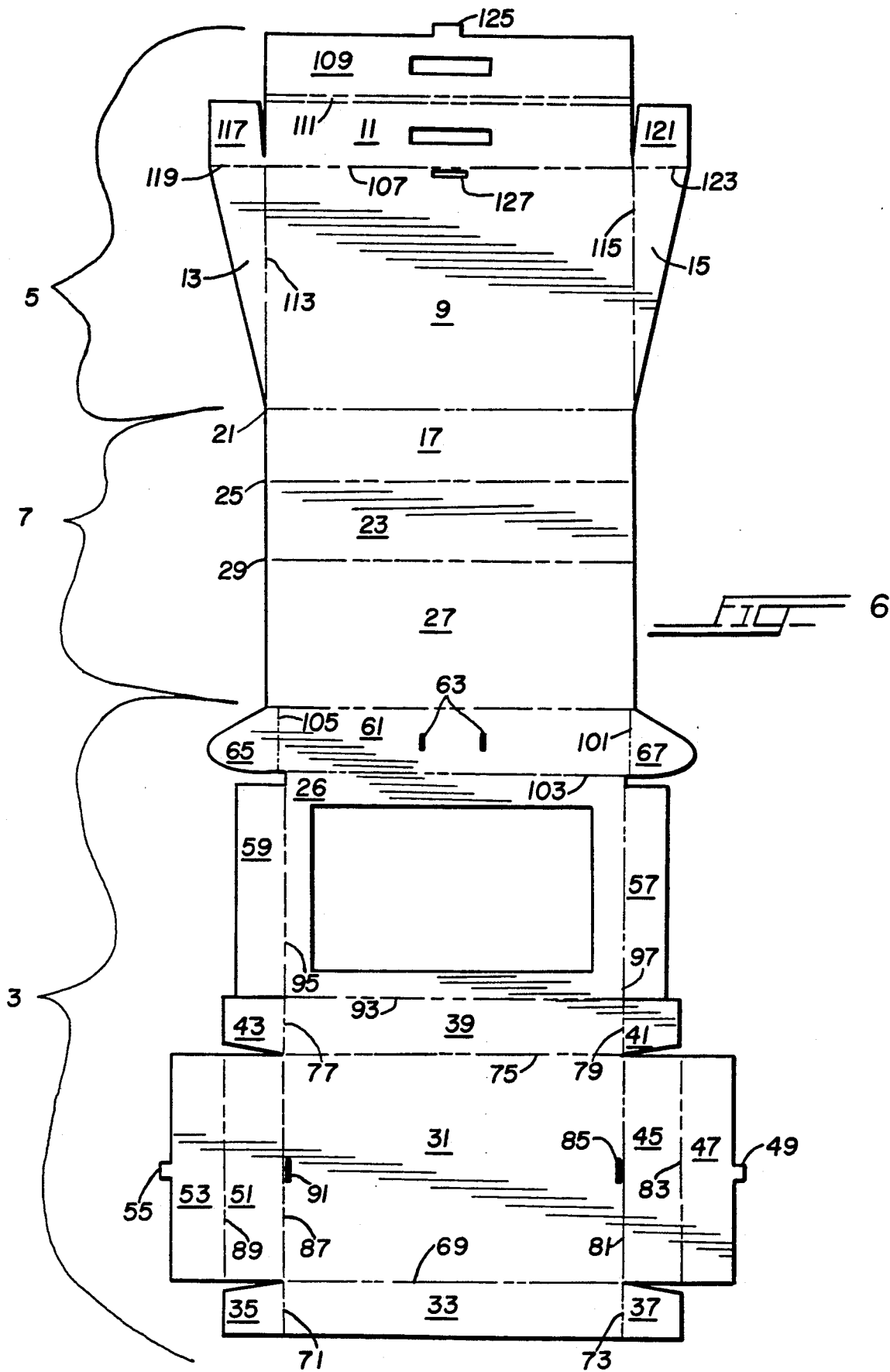

SINGLE PIECE DISPOSABLE CAT LITTER BOX

BACKGROUND OF THE INVENTION

The invention relates to the use of foldable boxes in the field of packaging wherein a lower box body and a cover to the lower box body is created from a single piece of material with strategically placed fold lines forming a unitary construction between the lower box body and the cover by means of a connecting hinge. In particular, the invention encompasses the use of single piece foldable boxes for packaging of cat litter.

Typically, a single piece foldable box is used for the packaging/display of small costume jewelry and is customarily called a display box. Such a display box includes a lower box body (or base), four side walls integrally attached to the base, and a cover (or top) with four walls integrally attached to the cover, further connected to the lower box body by a hinge member. An example of such a single piece display package is shown in U.S. Pat. No. 2,317,203—Kurhan. Such a foldable box is created from a single piece of material, such as cardboard, with intricately shaped components employing fold lines stamped at predetermined locations. The components are folded at the fold lines in a series of steps thereby creating the intended display package configuration. The completed box provides unitary construction by connecting the lower box body and the cover by a non-detachable hinge.

The benefit of the display box is made apparent when it is used for storage and display of costume jewelry. A jeweler can store merchandise within the box and reveal the contents of the box in the customary fashion by removal of the cover. However, since the top is an integral part of the structure of the one piece foldable box, the complete removal and possible loss of the cover is prevented. A further advantage of one piece display packages is the use of the cover as a stand, whereby the merchandise in the box can be displayed at an inclined angle by placement of the lower box body upon the cover. Still another advantage of one piece construction is the manufacturing aspect, wherein materials required for design, construction, and storage consist of a single piece of material.

The disadvantages of the one piece foldable packaging of the prior art is the inflexibility of design making the one piece box only practical for small items. The inherent design problems are especially noticeable on large boxes, for a fourth side wall of the cover makes the connecting hinge member's utility prohibitive. For example, a cover with four side walls requires sufficient tolerance between the box walls and the encompassing cover walls so that the cover will fit over the lower box body while maintaining the hinge member's integrity. If the cover has a tight tolerance, the hinge member will prevent placement of the cover over the lower box body unless the hinge is sufficiently flexible to allow the cover to be raised over the lip of the box.

The present invention is a significant improvement in the art of single piece foldable boxes, wherein one improvement permits a single piece box to be utilized for larger packaging requirements that are currently impractical, if not impossible, with present designs. The invention is similar to the display package for it is created from a single piece of material (preferably cardboard) with intricately cut components and strategically placed fold lines stamped at predetermined locations. The invention includes a lower box body (or base), four side walls integrally attached to the base, and a cover (or top) with three walls integrally attached to the cover, and further connected to the lower box body by a novel hinge member. The hinge member creates a fourth end wall to the cover only when the cover is in a closed position.

The present invention overcomes the limitations of size and/or material restrictions incurred within the field by use of the novel hinge member which creates a fourth end wall to the cover only when the cover is in a "closed position". Upon opening the cover, the fourth wall, which is formed by an integral section of the hinge member, folds upon itself into a position directly beneath the lower box body. Since the invention is not dependant on size, the cover and attached hinge member can be stored completely beneath the lower box body thus allowing the packaging of materials not capable of being stored by the prior art.

SUMMARY OF THE INVENTION

The present invention relates to the use of boxes in the field of packaging, wherein a lower box body and a cover to the lower box body is created from a single piece of material with strategically placed fold lines forming a unitary construction between the lower box body and the cover by means of a connecting hinge member. In particular, the invention encompasses the use of single piece foldable boxes for the packaging of cat litter.

The present invention employs a novel cover and connecting hinge member which has a plurality of foldable sections, a portion of which creates a fourth wall to the cover while the cover is in a closed position. The cover has one end wall, two parallel, opposed triangular shaped side walls, and an opposite end wall (or fourth wall) created by a rigid section of the connecting hinge member, only when the cover is in a closed position. The present invention permits a one piece foldable box to be utilized for packaging purposes that are currently impractical, if not impossible, to accomplish with typical one piece foldable boxes. The invention has a practical use for the packaging of cat litter wherein the litter material is stored within the lower box body and the cover is secured over the contents of the lower box body by a latching mechanism. To use the litter material, one simply removes the cover by lifting it over the latching mechanism, thereby exposing the litter material. The latching mechanism creates a handle allowing one to carry the box in a similar fashion as one would carry a suitcase. To store the cover beneath the lower box body, the cover is laid in a flat, inverted position, a position forced by the fold lines of the connecting hinge member, in a plane horizontal to the bottom of the box. The lower box body is then lifted over and directly onto the now inverted cover without breaking the horizontal plane of the lower box body thereby preventing spillage of the lower box body's contents. The storage of the cover beneath the lower box body prevents the possibility of loss or damage to the cover and further provides a layer of protection between the lower box body and the ground or support surface. The fully exposed cat litter material can now be used for its intended purpose. Upon exhaustion of the material, the lower box body is lifted up and off the inverted cover in a reverse manner to the steps described above. The cover is folded up and placed back over the lower box body, secured by the latching mechanism. The entire container can then be disposed of in the proper manner. The lower box body can also be detached from the cover at a particular fold line and treated for moisture resistance without loss of design integrity. The flexibility of the instant invention is further made apparent in its use as a display package. The cover can be folded on top of the connecting hinge member into a position where it is directly behind the lower box body. The sloping side walls of the cover forms an inclined front surface of the cover, capable of supporting the lower box body at an inclined angle for use as a display.

A further example of the flexibility of the instant invention is the variety of shroud sizes or openings in the lower box body that can be configured during removal of material during blank cutting. The shroud opening can be non-existent, thus sealing the contents until an opening is made to expose the contents; or the shroud may consist of a fine slot for use as a tissue dispenser; or the shroud may consist of a larger slot for use of the container as a garbage bag or towel dispenser; or the shroud may be sealed with plastic and the container used to seal seldom worn garments (wedding dresses—wool coats) yet allow viewing of the garment.

The invention can be used for containerized items that are larger or smaller than the examples described in this document and such uses will be readily apparent to one of ordinary skill in the art.

An object of the present invention is to provide a one-piece foldable box for ease of packaging and disposing of cat litter, whereby the cover of the box can be stored beneath the lower box body to prevent loss or damage while the litter is exposed.

Still another object of the invention is to provide a one-piece foldable box with a lower box body that employs a shroud to prevent loss of contents during storage or use.

Yet another object of the present invention is to provide a means for varying the size of the shroud of the lower box body.

Another object of the present invention is to provide a one-piece foldable box with a multi-purpose cover that effectively seals the contents of the box through a large range of sizes and/or materials of construction.

Still another object of the present invention is to provide a one-piece foldable box with a novel hinge design that permits uniformity of design by utilizing three rigid walls and formation of a fourth rigid wall upon closing of the cover.

A further object of the invention to provide reinforcement and/or insulation to the bottom of the lower box body by placement of the hinge and cover in a position beneath the lower box body.

Still another object of the invention is to provide a means for treating the cover and lower box separately while maintaining the integrity of the connecting hinge member.

Another object of the invention is to provide a display package wherein the cover of the package remains in a upright position, folded behind the lower box body, creating a display stand for the lower box and maintaining the lower box at an inclined angle.

These and other objects of this invention will be apparent as further described in the detailed description of the embodiment.

DESCRIPTION OF THE DRAWINGS

FIG. 1, is a perspective view of the invention illustrating its use as a cat litter box shown in a closed condition;

FIG. 2 is a perspective view thereof showing the cover in an open, inverted position exposing the opening in the lower box body;

FIG. 3 is a perspective view thereof showing the lower box body in a position ready to be inserted into the inverted cover for use as a cat litter box;

FIG. 4 is a perspective view thereof showing the lower box body situated within the inverted cover;

FIG. 5 is a perspective view of the invention showing the lower box body situated in an inclined position for use of the invention as a display package; and FIG. 6 is a view of the container blank from which the package is made.

DETAILED DESCRIPTION OF THE INVENTION

Referring to FIG. 1, the invention consists of three main components: a lower box body 3, a cover 5, and a connecting accordion-type hinge member 7. The invention is shown as rectangular in shape. The cover consists of a top surface 9, a front end wall 11, and sloping, triangular shaped side walls 13, 15. The hinge member 7 forms a vertical rear end wall 17 when the cover is in the closed position of FIG. 1. The cover is maintained in a closed position by means of a latch 19 provided on the lower box body which cooperates with a cutout 21 in the front end wall 11 of the cover.

The hinge member 7 connects the lower box body and cover. The hinge member consists of a plurality of rigid sections separated by fold lines, with an endmost section 17 defining the above mentioned end wall being connected to the cover by a fold line 21 at one end edge of the cover and connected to an intermediate section 23 by a fold line 25. The intermediate section 23 is further defined and separated from an opposite endmost section 27 by a fold line 29. When the hinge member is closed, fold line 29 is in a horizontal plane parallel to the lower box body while fold lines 21 and 25 form 90 degree corners creating the fourth side 17.

Referring to FIG. 2, exposing the contents of the box requires the cover to be lifted over the latch 19 and inverting the cover. A containerized portion of the lower box body 3 consists of a bottom wall 31, two side walls 18, 20 a front wall 22, a rear wall 24, and an annular upper rim 26 which determines the size of the opening of the lower box body. The box can now be used as shown, or the cover can be stored beneath the lower box body for convenience and to prevent damage to the cover. FIG. 3 shows the cover under the lower box body and maintained in a horizontal plane to prevent loss of material placed within the lower box body. The hinge member folds beneath the lower box body by folding hinge members 17 and 23 at fold line 25 into a 180 degree fold while maintaining hinge member 27 flat against the outside portion of bottom 31.

The preferred use of the invention is for a cat litter box. For example, as shown in FIG. 1, the invention allows litter material to be placed within the lower box body utilizing the cover for a seal until use. Upon opening the box, the cover is folded back flat as shown in FIG. 2. The lower box body (full of litter for this example) is then lifted in a horizontal position, (FIG. 3), and placed on top of the inverted box, as shown in FIG. 4.

Per this example, when the litter material is used up, the cover is placed back on the lower box body in a reverse order to the steps mentioned above.

Referring to FIG. 5, another use of the present invention is for a display package. The cover and hinge member can be inverted pursuant to the aforementioned example by simply folding the cover on top of the hinge member. Side walls 13, 15 rest upon a flat portion thereby forming an inclined end wall 11. The end wall then provides the backing support surface for the lower box body to be displayed at an angle suitable for display purposes.

Referring to FIG. 6, the blank from which the package is made is shown. Beginning with the bottom 31 of the lower box body, a first side end wall to the lower box body is created from a side flap 33 which is integral to the bottom of the lower box body utilizing a first wing flap 35 and a second wing flap 37. An opposite side flap 39 of similar size to the first side wall creates a second side wall with a mirror-image wing flap 41 and a second wing flap 43. The two remaining walls necessary to create the lower box body are formed by an outside end flap 45 which is integral to box bottom and an inside end flap 47 shown with a locking tab 49. The opposite end wall mirrors this design by use of an outside end flap 51 integral to the lower box body by use of an inside wall flap 53 shown with locking tab 55. The lower box body upper annular rim has an end wall 57 and an end wall 59 integral therewith to provide rigidity to the rim on either side of the end walls 45, 51, respectively. A final side wall 61 is used for securing a latch or handle that can be placed in the wall at cutouts 63. A first locking tab 65 and a second locking tab 67 are beveled for securing the side wall 61 against side wall 33, thereby preventing the latch from release during handling.

In setting up the lower box body, side flap 33 is folded upwardly at a fold line 69, wing flap 35 is folded inwardly at a 15 fold line 71 and wing flap 37 is folded inwardly at a fold line 73. Box side flap 39 is then folded upwardly at a fold line 75, wing flap 43 is folded inwardly at a fold line 77 and wing flap 41 is folded inwardly at a fold line 79. Outside flap 45 is then folded upwardly at a fold line 81 behind the wing flaps 37 and 41 and then inside flap 47 is folded downwardly at a fold line 83 thereby sandwiching the two wing flaps 37 and 41 between it and flap 45, where it is locked into place by insertion of locking tab 49 into a slot 85. The opposite end is similarly formed by folding outside end flap 51 upwardly at a fold line 87 behind wing flaps 35 and 43 with inside end flap 53 then folded downwardly at a fold line 89 sandwiching end wing flaps 35 and 43 and securing them in place by inserting locking tab 55 into a slot 91.

The lower box body can be separated at a fold line 93 for special coating. For completion of the lower box body, the shroud end 59 is folded upwardly at a fold line 95 and shroud end 57 is folded up at a fold line 97. The shroud or annular rim portion is then folded over 90 degrees at fold line 93, if not previously separated, to form an enclosure opposite base portion 31. For final securing of the shroud to the lower box body, wing flap 67 is folded inwardly at a fold line 101 and side flap wing 65 is also folded inwardly at a fold line 105. The side flap wing 67 is then inserted between the outside flap wall flap 45 and the wing flap 37 as they are forced together by the inside wall flap 47, while side flap 61 is folded at a fold line 103. The wing flap 65 is further folded at a fold line 105 and simultaneously inserted between the outside wall flap 53 and the wing flap 35 as they are forced together by the inside wall flap 51.

For specialized applications, the lower box body can be separated at fold line 93 for purposes such as treating the lower box body section with moisture repellent material without the expense of treating the entire article. The cover can then be reinstalled without special tools or adhesion. Further, the box will perform in the same manner as mention throughout this embodiment without loss of the hinge member's intended design.

To form the cover, a double end wall is created by folding end wall 11 upwardly at a fold line 107, and a second end wall 109 is folded over at a fold line 111. Side 13 is folded upwardly at a fold line 113 at a 90 degree angle to the top, and side wall 15 is also folded upwardly at a fold line 115. A side wall wing 117 is folded inwardly at a fold line 119 and inserted between the double wall formed by end walls 11 & 109. Side wing 121 is also folded inwardly at a fold line 123 and inserted between the double walls 11 & 109. The double wall is secured by use of a locking tab 125 received in a cutout 127 to prevent an undesired opening, and securely held by side tails 117 and 121 between walls 11 and 109. The cover is then closed by folding hinge members 23 and 27 against the bottom portion the lower box body 31, thereby wrapping the hinge members around the lower box body until the inside of the top 9 meets the outside of the lower box body upper annular rim.

Further modifications will also occur to those skilled in this art and such are considered to fall within the spirit and scope of this invention as defined in the claims.

What is claimed is:

1. A container comprising:
   a cover portion comprising an upper surface and a pair of side surfaces projecting downwardly from said upper surface, said upper surface having a rear edge and a forward edge;
   a main box portion comprising a front wall, a rear wall, a pair of side walls, each of said walls of said main box portion having an upper surface and a lower surface, said walls defining therebetween a storage volume;
   a hinge-member portion having a first end connected to said rear edge of said upper surface of said cover portion, and a second end connected to said lower portion of said front wall of said main box portion;
   said cover portion also comprising a front wall, said pair of side surfaces of said cover portion being substantially triangular in shape, each said side surface becoming narrower in height in a direction from said front wall of said cover portion toward said rear edge of said upper surface of said cover portion;
   said hinge-member portion comprising a first section, a second section, and a third section, a first fold line between said first and second sections, and a second fold line between said second and third sections; said hinge-member portion being connected to said lower surface of said front wall of said main box portion by said first section, and said hinge-member portion being connected to said upper surface of said cover portion by said third section; said first and third section being pivotally connected to said main box portion and said cover portion, respectively, whereby said hinge-member portion may folded in upon itself for placing the main box portion into the interior of the cover portion after the cover portion has been removed from its closing state on the main box portion;

said main box portion also comprising a lower wall, the upper surface portions of said walls of said main box portion defining an annular shroud;

the container being made of one-piece of flexible material, said cover portion, said main box portion, and said hinge-member portion being formed integrally together;

a third fold line at said first end of said hinge-member portion for pivotally connecting said hinge-member portion to said main box portion, and a fourth fold line at said second end of hinge-member portion for pivotally connecting said hinge-member to said cover portion; whereby said cover portion and said main box portion is pivotal relative to said hinge-member portion.

2. The container according to claim 1, wherein said third section has a width substantially equal to the height of said rear wall, whereby, when the cover portion is placed over the main box portion, said third section forms the rear wall of the cover portion and is juxtapositioned adjacent and substantially parallel to said rear wall of said main box portion.

* * * * *